(No Model.)
W. H. KNIGHT.
ELECTRICALLY PROPELLED VEHICLE.
No. 382,990. Patented May 15, 1888.
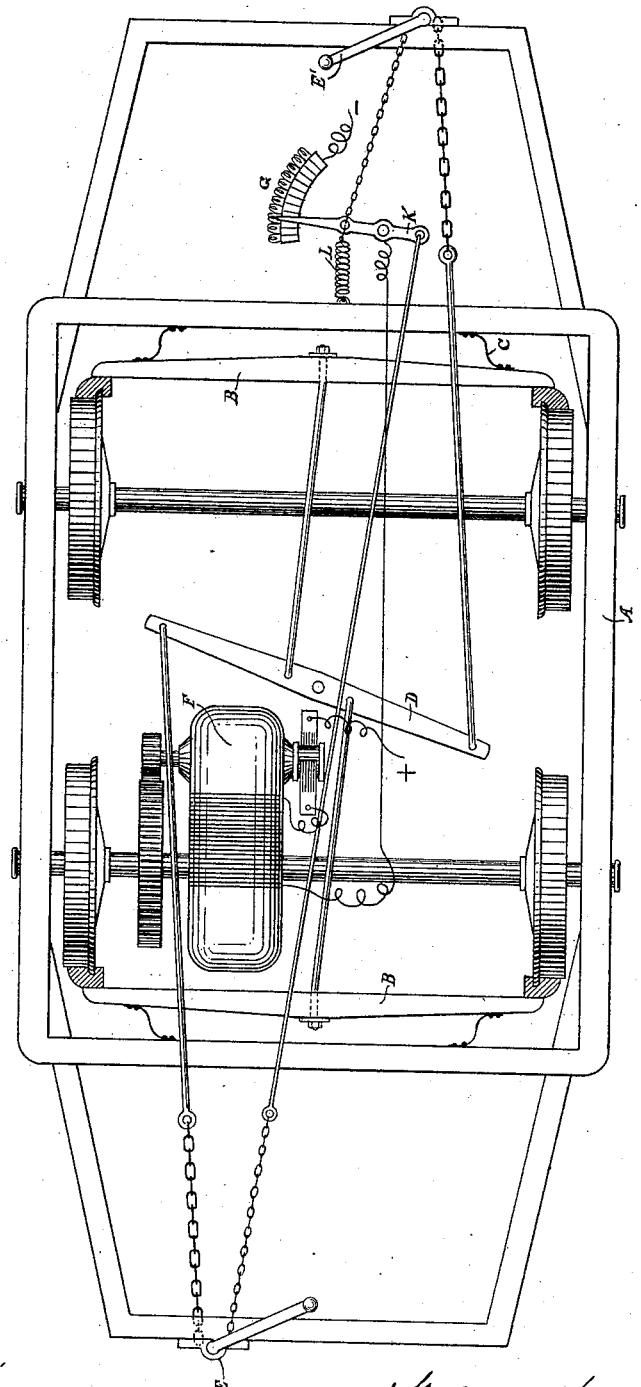
WITNESSES.
INVENTOR.

UNITED STATES PATENT OFFICE.

WALTER H. KNIGHT, OF NEW YORK, N. Y.

ELECTRICALLY-PROPELLED VEHICLE.

SPECIFICATION forming part of Letters Patent No. 382,990, dated May 15, 1888.

Application filed January 20, 1888. Serial No. 261,347. (No model.)

*To all whom it may concern:*

Be it known that I, WALTER H. KNIGHT, a citizen of the United States, residing at New York, in the county of New York, State of New York, have invented certain new and useful Improvements in Electrically-Propelled Vehicles, of which the following is a specification.

My invention relates to electrically-propelled vehicles; and it consists in an electrical or circuit-controlling regulator for the propelling-motor, which is controlled by the same manual devices at each end of the vehicle by which the brake for the vehicle is actuated.

My invention is illustrated in the accompanying drawing.

A represents the frame of the vehicle, which is provided with an extension at each end adapted to carry a platform, from which the car can be controlled in either direction of progress.

B are the ordinary brake-beams, having retractile springs C. A lever, D, is pivoted in the center of the vehicle, and from each side of its fulcrum a connection-rod extends to the opposite ends of the vehicle, respectively, where they terminate in chains adapted to be wound on the brake-spindles E E'.

F is the propelling-motor geared to the axle.

G is a resistance in the main circuit controlling the admission of the current to the motor, and thus acting as an electrical or circuit-controlling regulator. Any other form of electrical controlling device for the motor may be employed. A lever, K, sweeps over this resistance, a spring, L, actuating it in a direction to throw in the resistance, while for working it in the opposite direction a connection leads from opposite sides of the fulcrum of K to the two brake-spindles, where the chains are wound on in an opposite direction to the brake-chains. When, therefore, the spindle is turned in one direction, the brakes are set and the resistance brought into circuit, stopping the motor, while when turned in the other direction the brakes come off and the resistance is cut out, starting the motor.

The device is so adjusted that the whole range of the resistance comes into play before the brakes are set, while the brakes, on the other hand, come off before the current is admitted to the motor.

I claim—

1. In an electrically-propelled vehicle, the combination, with the propelling-motor, of a circuit-controlling regulator therefor, an actuating-spring for moving it in one direction, a manual device for moving it in the opposite direction, and a brake for the vehicle controlled by said device.

2. In an electrically-propelled vehicle, the combination, with the propelling-motor, of a circuit-controlling regulator therefor, an actuating-spring for operating it in one direction, a manual device for operating it in the opposite direction, and a brake for the vehicle controlled by said device.

3. In an electrically-propelled vehicle, the combination, with the propelling-motor, of a circuit-controlling regulator therefor, a manual device on each end of the vehicle for actuating said regulator, and a brake for the vehicle controlled by said manual device.

4. In an electrically-propelled vehicle, the combination, with a brake, of a retractile spring therefor, a manual device on each end of the vehicle for actuating said brake, and an electrical regulator therefor connected with the said devices so as to be worked thereby.

5. In an electrically-propelled vehicle, the combination, with the brake, of a retractile spring therefor, a manual device on each end of the vehicle for actuating said brake, the propelling-motor, an electrical regulator therefor, a spring for actuating it in one direction, and a connection with the said manual devices for actuating it in the other direction.

6. The combination, in an electrically-propelled vehicle, of a resistance, a brake, and a common actuating device therefor extending to opposite ends of said vehicle.

WALTER H. KNIGHT.

Witnesses:
ROBT. W. BLACKWELL,
JOS. L. BLACKWELL.